No. 614,509. Patented Nov. 22, 1898.
F. C. SMITH.
HOSE COUPLING.
(Application filed June 17, 1898.)

(No Model.)

Witnesses:
E. R. Shipley
M. S. Belden.

Frank C. Smith
Inventor
by James W. See
Attorney

UNITED STATES PATENT OFFICE.

FRANK C. SMITH, OF DELAWARE, OHIO, ASSIGNOR TO THE MANHATTAN RUBBER MANUFACTURING COMPANY, OF PASSAIC, NEW JERSEY.

HOSE-COUPLING.

SPECIFICATION forming part of Letters Patent No. 614,509, dated November 22, 1898.

Application filed June 17, 1898. Serial No. 633,673. (No model.)

*To all whom it may concern:*

Be it known that I, FRANK C. SMITH, of Delaware, Delaware county, Ohio, have invented certain new and useful Improvements in Hose-Couplings, of which the following is a specification.

This invention pertains to improvements in hose-couplings, the object of the improvement being to prevent the rotting of the end of the hose where it is engaged by the shank of the coupling and by the clamp which secures the hose to the coupling-shank.

My improvement will be readily understood from the following description, taken in connection with the accompanying drawings, in which—

Figure 1:
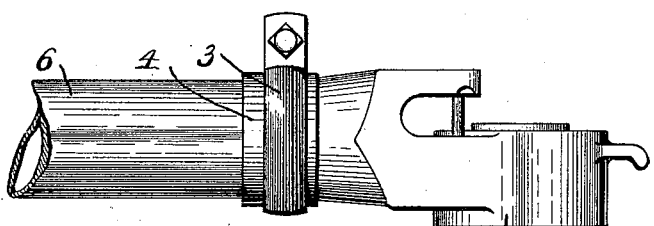
Figure 2:
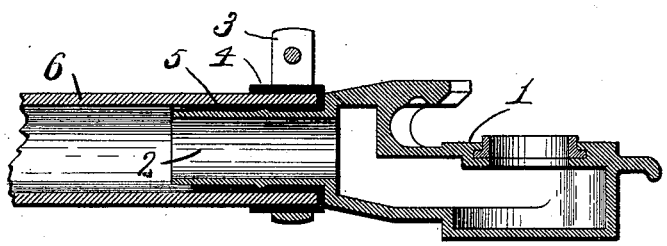

Figure 1 is a side elevation of a coupling and attached hose provided with my improvement, and Fig. 2 is a vertical longitudinal section of the same.

In the drawings, 1 indicates a hose-coupling member, exemplified in the present case by a form well known in connection with train-pipes of air-brakes on railways; 2, the shank of the coupling entering within the end of the hose; 3, the usual hose-clamp or drawband to bind the end of the hose to the coupling-shank which it engages; 4, a sleeve, preferably of rubber, surrounding the end of the hose within clamp 3 and forming a lining for the clamp; 5, a sleeve disposed within the end of the hose and forming a lining therefor and surrounding the shank of the coupling, sleeves 4 and 5 being formed in one structure, as shown, sleeve 5 extending out and around the end of the hose and then back along its exterior within the clamp, and 6 the hose.

In common experience with ordinary couplings employed for air-brake purposes it is found that the moisture in the air results in damage to the end of the hose, causing rotting at the surfaces engaged by the coupling-shank and by the clamp. By means of my improvement the end of the hose is guarded against contact with the clamp and with the surface of the coupling-shank where compression is exerted upon the hose by the clamp, and any rotting which takes place occurs at the sleeves. The sleeves may be of more suitable material than the general hose structure, thus to a great extent avoiding the rotting action, and at the same time the sleeve structure, being separable, is susceptible of easy and cheap renewal in case rotting takes place.

While the improvement has been exemplified in connection with air-brake hose-couplings, it is of high value in connection with hose-couplings employed for use with hose conveying water or steam or other material.

I claim as my invention—

In a hose-coupling, the combination, substantially as set forth, with a coupling having a shank, a hose end surrounding the shank, and a clamp surrounding the hose end and coupling-shank, of a sleeve structure disposed within the hose end and around the coupling-shank and extending over the end of the hose and covering the exterior of the hose within the hose-clamp.

FRANK C. SMITH.

Witnesses:
A. L. SMITH,
R. B. SMITH.